(12) United States Patent
Suntinger et al.

(10) Patent No.: US 8,610,718 B2
(45) Date of Patent: Dec. 17, 2013

(54) METHOD OF VISUALIZING SETS OF CORRELATED EVENTS ON A DISPLAY

(75) Inventors: Martin Suntinger, Vienna (AT); Hannes Obweger, Klagenfurt (AT); Josef Schiefer, Vienna (AT)

(73) Assignee: Automic Software GmbH, Wolfsgraben (AT)

( * ) Notice: Subject to any disclaimer, the term of this patent is extended or adjusted under 35 U.S.C. 154(b) by 949 days.

(21) Appl. No.: 12/107,443

(22) Filed: Apr. 22, 2008

(65) Prior Publication Data

US 2009/0262131 A1     Oct. 22, 2009

(51) Int. Cl.
*G06T 11/20*     (2006.01)

(52) U.S. Cl.
USPC ........................................................ 345/440

(58) Field of Classification Search
CPC ................................................... G06T 11/206
USPC ........................................................ 345/440
See application file for complete search history.

(56) References Cited

U.S. PATENT DOCUMENTS

| | | | | |
|---|---|---|---|---|
| 6,151,595 | A * | 11/2000 | Pirolli et al. ................ | 707/1 |
| 6,188,403 | B1 * | 2/2001 | Sacerdoti et al. ............ | 345/440 |
| 6,222,540 | B1 * | 4/2001 | Sacerdoti ..................... | 345/440 |
| 6,390,508 | B2 * | 5/2002 | Levine ......................... | 345/440 |

OTHER PUBLICATIONS

Martin Suntinger, Hannes Obweger, Josef Schiefer, M. Eduard Gröller; The Event Tunnel: Interactive Visualization of Complex Event Streams for Business Process Pattern Analysis; May 2007; Technische Universität Wien; TR-186-2-07-07; pp. 1-13.*
Gerhard Hacker, Enterprise 2.0, Master Thesis, Johannes Kepler Universität Linz , Dec. 2006, pp. 1-113.*
Eric Shaffer, Daniel A. Reed, Shannon Whitmore, Benjamin Schaeffer; Virtue: Performance Visualization of Parallel and Distributed Applications; Dec. 1999; IEEE Computer Society; vol. 32 Issue 12, pp. 44-51.*
Eric Shaffer, Daniel A. Reed; Real-Time Immersive Performance Visualization and Steering; May 2000; ACM SIGGRAPH Computer Graphics; vol. 34 Issue 2, pp. 11-14.*
Ed H. Chi, James Pitkow, Jock Mackinlay, Peter Pirolli, Rich Gossweiler, Stuart K. Card; Visualizing the Evolution of Web Ecologies; Apr. 1998; CHI '98 Proceedings of the SIGCHI conference on Human factors in computing systems; pp. 400-407.*
Lars Erik Holmquist, Henrik Fagrell and Roberto Busso; Navigating Cyberspace with CyberGeo Maps; 1998; pp. 1-8.*

(Continued)

*Primary Examiner* — Jeffery A Brier
(74) *Attorney, Agent, or Firm* — Hoffmann & Baron, LLP

(57) ABSTRACT

A method of visualizing sets of correlated events of a stream of events on a display, each event having a time of occurrence in the stream and at least one attribute indicating its correlation with the other events of a set, including the steps of plotting a glyph for each event on the display at a radial distance and an angular position with respect to an origin; the radial distance and the size of a glyph being proportional to the occurrence time of its event; the angular position of the glyph of a succeeding event in a set being chosen equal to that of the preceding event in the set unless these two glyphs would over-lap in which case the angular position of the glyph of said subsequent event is shifted in a given direction by an amount just sufficient to avoid such overlap; and the angular position of the glyph of the first event in a set being chosen so that overlapping of all glyphs is minimized.

19 Claims, 9 Drawing Sheets

(56) References Cited

OTHER PUBLICATIONS

Martin Suntinger, Hannes Obweger, Josef Schiefer, and Eduard Gröller, The Event Tunnel: Interactive Visualization of Complex Event Streams for Business Process Pattern Analysis, Mar. 7, IEEE Pacific Visualization Symposium 2008, PacificVIS'08, pp. 111-118.*

Bederson et al.; "Jazz: An Extensible Zoomable User Interface Graphics Toolkit in Java"; Human-Computer Interaction Lab; Institute for Advanced Computer Studies, Computer Science Department; University of Maryland; 10 pages, 2000.

Carlis et al.; "Interactive Visualization of Serial Periodic Data"; Department of Computer Science and Engineering, University of Minnesota; pp. 1-10, Nov. 1998.

Fawcett et al.; "Adaptive Fraud Detection"; Data Mining and Knowledge Discovery, to appear, 1-28 (1997); copyright 1997 Kluwer Academic Publishers, Boston, Manufactured in the Netherlands; pp. 1-29.

Hao et al.; "Business process impact visualization and anomaly detection"; Information Visualization (2006) 5, 15-27; copyright 2006 Palgrave Macmillan Ltd.; pp. 15-27.

Kapoor et al.; "Visual Analysis for a Sense-and-Respond Enterprise"; IBM T.J. Watson Research Center, Yorktown Heights, NY; 6 pages, 2003.

Luckham, D.; "The Power of Events an Introduction to Complex Event Processing in Distributed Enterprise Systems"; 5 pages (preface), 2002.

Maniatis et al.; "Advanced Visualization for OLAP"; National Technical University of Athens, Dept. of Elec. and Computer Eng., Athens, Hellas and University of Ioannina, Dept. of Computer Science, Ioannina, Hellas; 8 pages, Nov. 7, 2003.

Nguyen et al.; "Sense & Response Service Architecture (SARESA): An Approach towards a Real-time Business Intelligence Solution and its use for a Fraud Detection Application"; pp. 77-86, Nov. 4, 2005.

Rozsnyai et al.; "Event Cloud—Searching for Correlated Business Events"; 8 pages, 2007.

Rundensteiner et al.; "XmdvTool: Visual Interactive Data Exploration and Trend Discovery of High-dimensional Data Sets"; ACM SIGMOD Jun. 4-6, 2002 Madison, Wisconsin, USA; Copyright 2001 ACM 1-58113-497—May 2, 2006; 1 page.

Sebrechts et al.; "Visualization of Search Results: A Comparative Evaluation of Text, 2D, and 3D Interfaces"; 8 pages, 1999.

Stolte et al.; "Polaris: A System for Query, Analysis, and Visualization of Multidimensional Relational Databases"; IEEE Transactions on Visualization and Computer Graphics, vol. 8, No. 1, Jan.-Mar. 2002; pp. 1-14.

Techapichetvanich et al.; "Interactive Visualization for OLAP"; O. Gervasi et al. (Eds): ICCSA 2005, LNCS 3482, pp. 206-214, 2005; copyright Springer-Verlag Berlin Heidelberg 2005.

Weber et al.; "Visualizing Time-Series on Spirals"; 6 pages, 2001.

Yee et al.; "Animated Exploration of Dynamic Graphs with Radial Layout"; 8 pages, 2001.

* cited by examiner $$\text{comment}: \text{Plot events according to the CESP} \\
\text{ORDER BY TIME (events)} \\
\text{for } i \leftarrow 0 \text{ to events.length} \\
\text{do} \begin{cases} \text{if } i = 0 \\ \quad \text{then PLOTEVENT(events[i])} \\ \text{else} \begin{cases} \text{events}[i].\text{Angle} \leftarrow \text{events}[i-1].\text{Angle} \\ \text{if OVERLAP(events[i], events[i-1])} \\ \quad \text{then SHIFTCLOCKWISE(events[i])} \\ \text{PLOTEVENT(events[i])} \end{cases} \end{cases} \quad (1)$$

*Fig. 4a*

METHOD OF VISUALIZING SETS OF CORRELATED EVENTS ON A DISPLAY

FIELD OF THE INVENTION

The present invention relates to a method of visualizing sets of correlated events of a stream of events on a display, each event having a time of occurrence in the stream and at least one attribute indicating its correlation with the other events of a set.

BACKGROUND OF THE INVENTION

Today's networked business environment requires systems which are adaptive and easy to integrate. Event-based systems have been developed and used to control business processes with loosely coupled systems. One of the most promising concepts for gaining insight into business processes in order to support closed loop decision-making on an operative level is Complex Event Processing. CEP includes a set of technologies to process large amounts of events, utilizing them to monitor, steer and optimize the business processes with minimal latency. Typical application areas of CEP require fast decision cycles based on a large number of observable business events which can be used to discover exceptional situations or business opportunities. Typically, these are areas like financial market analysis, trading, security, fraud detection, logistics like tracking shipments, compliance checks, and customer relationship management.

The success of event-driven business solutions depends on an ongoing learning process. It is an iterative cycle including the analysis and interpretation of past processing results and the conversion of these results into the event-processing logic. Analysis tools are required which are tailored to the characteristics of event data to answer questions like: Where did irregularities occur in my business? Did processes change over time? Upon which data were past, automated decisions made? Did errors occur in the automated decision process? What happened at a certain point in time at a certain location and who was involved? To answer these questions, the business analyst has to be equipped with extensive retrieval tools to extract required data sets.

STATE OF THE ART

Although event-based systems and applications are gaining increasing maturity and are starting to be employed in industrial settings, event-data specific visualization and analysis tools are still in their infancy. In the domain of business intelligence, many approaches exist, but they do not take into consideration the nature and special characteristics of events, in particular their time dimension aspects:

K. Techapichetvanich and A. Datta, "Interactive visualization for OLAP", Proceedings of the International Conference on Computational Science and its Applications, pages 206-214, 2005; and A. S. Maniatis, P. Vassiliadis, S. Skiadopoulos and Y. Vassiliou, "Advanced visualization for OLAP", Proceedings of the 6th ACM international workshop on Data warehousing and OLAP, pages 9-16, New York, N.Y. USA, 2003, ACM Press, describe visualization approaches for OLAP, which allow users to explore and analyze data cubes and data warehouses through the combination of interactive tools and navigational functions (i.e., drill-down, roll-up, and slicing).

M. C. Hao, D. A. Keim, U. Dayal and J. Schneidewind, "Business process impact visualization and anomaly detection", Information Visualization, 5(1): 15-27, 2006, presented VisImpact, an approach to reduce the complexity of business data by extracting impact factors that identify either single nodes or groups of nodes from business flow diagrams that influence business operations.

S. Kapoor, D. L. Gresh, J. Schiefer, P. Chowdhary and S. Buckley, "Visual analysis for a sense-and-respond enterprise", IASTED Conference on Software Engineering, pages 136-141, IASTED/ACTA Press, 2004, proposed OPAL, which uses classical visualization techniques (charts, time tables, histograms, scatter plots) for operational, multidimensional data about business operations.

E. A. Rundensteiner, M. O. Ward, J. Yang and P. R. Doshi, "Xmdv-Tool: visual interactive data exploration and trend discovery of highdimensional data sets", Proceedings of the 2002 ACM SIGMOD international conference on Management of data, pages 631-631, New York, N.Y. USA, 2002, ACM Press, implemented the Xmdv-Tool for multivariate data visualization that allows users to view data from different perspectives, including brushing in screen space, data space, and structure space, panning, zooming and distortion.

Polaris, proposed by C. Stolte, D. Tang and P. Hanrahan, "Polaris: A system for query, analysis, and visualization of multidimensional relational databases", IEEE Transactions on Visualization and Computer Graphics, 8(1): 52-65, 2002, provides extensive visualization opportunities for multidimensional data, including glyph-based visual mapping to shape, size, orientation and color, however, without considering time aspects.

S. Rozsnyai, R. Vecera, J. Schiefer and A. Schatten, "Event cloud—searching for correlated business events", 4th IEEE International Conference on Enterprise Computing, E-Commerce and E-Services (EEE 2007), pages 409-420, 2007, proposed the search-engine Event Cloud for analyzing business events based on event queries. The system correlates and indexes the events in a data staging process and enables users to search in large sets of historical events by means of a text-based view. This is supported by the work of M. M. Sebrechts, J. V. Cugini, S. J. Laskowski, J. Vasilakis, and M. S. Miller, "Visualization of search results: a comparative evaluation of text, 2D, and 3D interfaces", Proceedings of the 22nd annual international ACM SIGIR conference on Research and development in information retrieval, pages 3-10, New York, N.Y. USA, 1999, ACM Press, who proposed that locating a search target is fastest in text-based views.

On the other hand, in the domain of information visualization, different approaches exist to display the time dimension of data which are, however, unable to cope with the specific inter-event correlation aspects of event data streams:

J. V. Carlis and J. A. Konstan, "Interactive visualization of serial periodic data", Proceedings of the 11th annual ACM symposium on User interface software and technology, pages 29-38, New York, N.Y. USA, 1998, ACM Press; and M. Weber, M. Alexa, and W. Müiller, "Visualizing time-series on spirals", Proceedings of the IEEE Symposium on Information Visualization 2001, pages 7-14, Washington, D.C. USA, 2001, IEEE Computer Society, proposed a time spiral, aiming on temporal patterns in periodic data. Arranging data in a spiral, their approaches provide the user with easy visual cues to both serial and periodic aspects of the data, along with interactions, such as the change in period over time.

K.-P. Yee, D. Fisher, R. Dhamija and M. Hearst, "Animated exploration of dynamic graphs with radial layout", Proceedings of the IEEE Symposium on Information Visualization 2001, pages 43-51, Washington, D.C. USA, 2001, IEEE Computer Society, show a visualization approach which uses a radial tree layout method for supporting the interactive exploration of graphs.

Therefore, there is a need to provide analysis tools which are specifically tailored to the characteristics of event data, and in particular for expressive visualization techniques which allow to navigate through massive event data and recognize recurring patterns and irregularities that influence business performance.

SUMMARY OF THE INVENTION

It is an object of the invention to fulfill these and other needs, to overcome problems associated with the prior art, and to provide a method of visualizing correlated event data which overcomes the above named shortcomings and considers the specific aspects of event streams containing correlated sets of events.

To this end, the invention provides a method of visualizing sets of correlated events of a stream of events on a display, each event having a time of occurrence in the stream and at least one attribute indicating its correlation with the other events of a set, comprising:

plotting a glyph for each event on the display at a radial distance and an angular position with respect to an origin, the radial distance and the size of a glyph being proportional to the occurrence time of its event, the angular position of the glyph of a succeeding event in a set being chosen equal to that of the preceding event in the set unless these two glyphs would overlap in which case the angular position of the glyph of said subsequent event is shifted in a given direction by an amount just sufficient to avoid such overlap, the angular position of the glyph of the first event in a set being chosen so that overlapping of all glyphs is minimized.

The invention is based on a novel concept of visualizing an event data stream as flowing in an "event tunnel" of which a very intuitively comprehensible top view is generated according to the method of the invention. The representation generated on the display gives the impression of looking into a tunnel in which correlated sets of events emerge as specific patterns or chains from the far end of the tunnel, evolving to the near end with progressing time.

By extracting and visualizing manageable data sets in the form of readily comprehensible and identifiable patterns, the method of the invention allows a user to discover relationships between events as well as impact factors for business operations which would remain hidden otherwise. The method of the invention is not dependent on certain process models and is able to visualize process-behavior specific patterns only on the basis of events generated from IT-systems. It does not reduce the complexity of the data, but allows investigating causal dependencies of events in a business environment.

According to preferred embodiments of the invention, minimum values for the radial distance and the size can be set which obviates the need for an excessively fine granularity in the center of the tunnel representation around the origin; and/or glyphs in a set can be connected by interconnection lines to ease interpretation; and/or at least one visual feature of a glyph can encode an attribute of its event in order to give further in-sights of a process at-a-glance.

In further preferred embodiments of the method of the invention said visual feature is the color and/or the shape and/or the size of the glyph, the latter thus being dependent from both, the occurrence time and said attribute.

Preferably, the surface of the glyph can optionally be subdivided into visually different sectors encoding different attributes of its event; and/or each glyph has the shape of a sphere which is surrounded by an outer ring encoding at least one further attribute of its event; and said outer ring can optionally be subdivided into visually different sectors encoding further different attributes of said event.

According to a further particularly preferred embodiment of the invention only glyphs of events are plotted which fall within a preselectable window of time. In this way, zooming in, zooming out, or time shifting effects can be obtained which allow for an intuitive "travel in time" through the event tunnel.

Preferably, several events can be grouped into a cluster event having a common occurrence time accorded thereto, and a glyph is plotted for each cluster event, just in the same way as for an event, however, using said common occurrence time. This allows for both, high-level views on the data as well as "drill-down" operations down to the level of single events.

Further objects, features and benefits of the invention will become apparent from the appended claims and the following detailed description of its preferred embodiments under reference to the enclosed drawings, wherein:

BRIEF DESCRIPTION OF THE DRAWINGS

FIG. 4*a* shows an exemplary implementation of the CESP algorithm for angular placement of event glyphs in the visualization process in pseudocode;

DETAILED DESCRIPTION OF THE PREFERRED EMBODIMENTS

Figure 1:
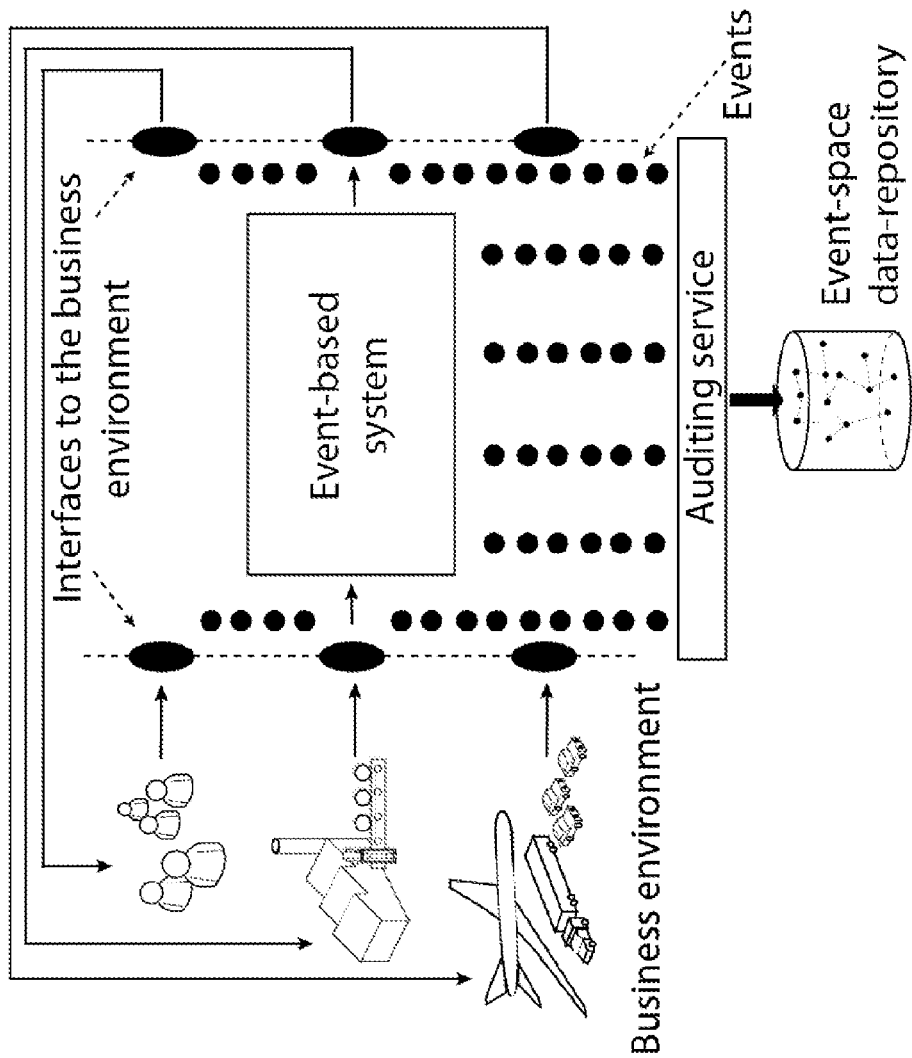
FIG. 1 shows the architecture of an exemplary event-based system having a backend system coupled thereto for capturing streams of events in a data repository.

FIG. 1 illustrates the overall architecture and data integration process. Continuous capturing and processing of events produces vast amounts of data. An efficient mass storage is required to store all events and prepare the data for later retrieval and analysis, i.e. a data repository, also called an "event space".

Figure 2:
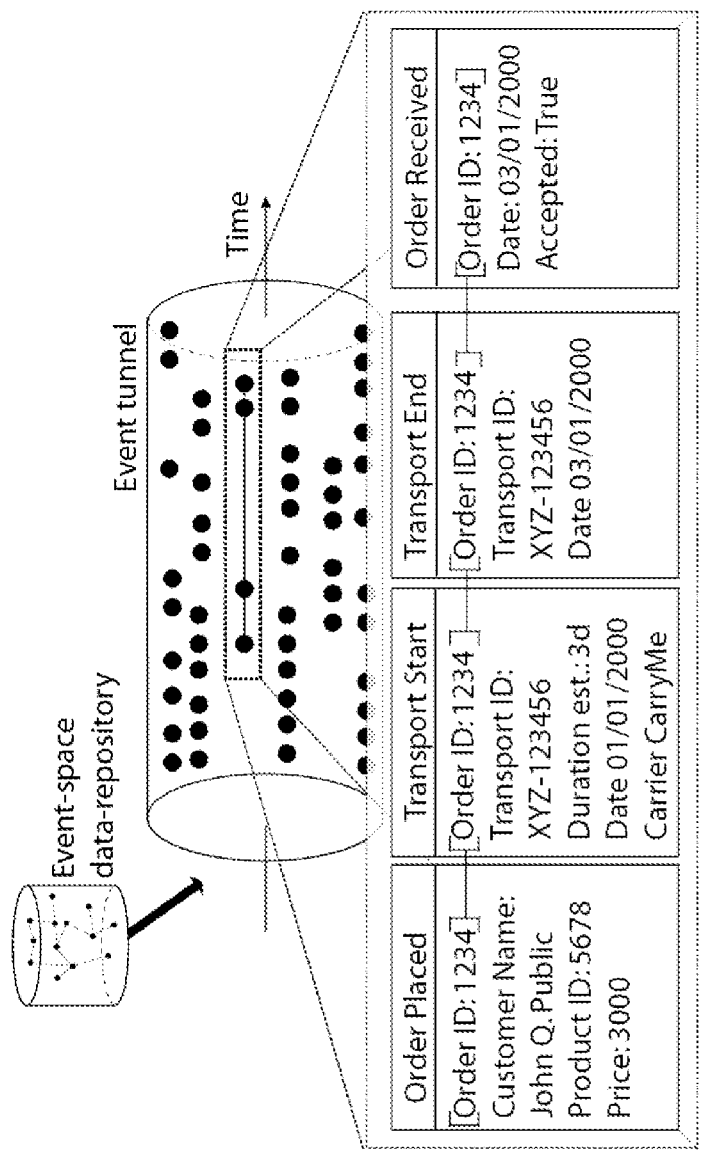
FIG. 2 shows an example of a business process which has led to a set of correlated events in an event stream which is depicted in an event tunnel side view.

For the purpose of maintaining information about business activities, events capture attributes about the context when they occurred. As shown in FIG. 2, a typical order event could have e.g. the following attributes as context information: customer name (string), order ID (string), product ID (string) and price (numeric).

This template of attributes defines the structure of a certain class of events and is called "event type". It indicates the underlying type of state change in a business process that is reflected by the event.

To back-trace and analyze the events of a business process, it is important to correlate temporally and semantically related events. Elements of an event context can be used to define a relationship between events. Sets (chains) of correlated events reflect instances of a business process. FIG. 2 shows a set of four correlated events pertaining to an order process, wherein the correlation of the events has been based on the event attribute "order ID" common to all four events and having the same value "1234" for all four events.

For event visualization a query-driven approach can be applied. A business analyst can define queries for extracting events from the data-repository in order to retrieve and prepare event streams for the visualization, e.g. by specifying filters for those events which shall be visualized with the present visualization technique. Such event filters (queries) can be specified e.g. in the form of:

Order.Price BETWEEN 100 AND 200 AND
OrderDelivered.Status IS "Delayed"

As the example shows, the query model allows defining a search scope for retrieving correlated events that match a set of conditions.

Figure 3:
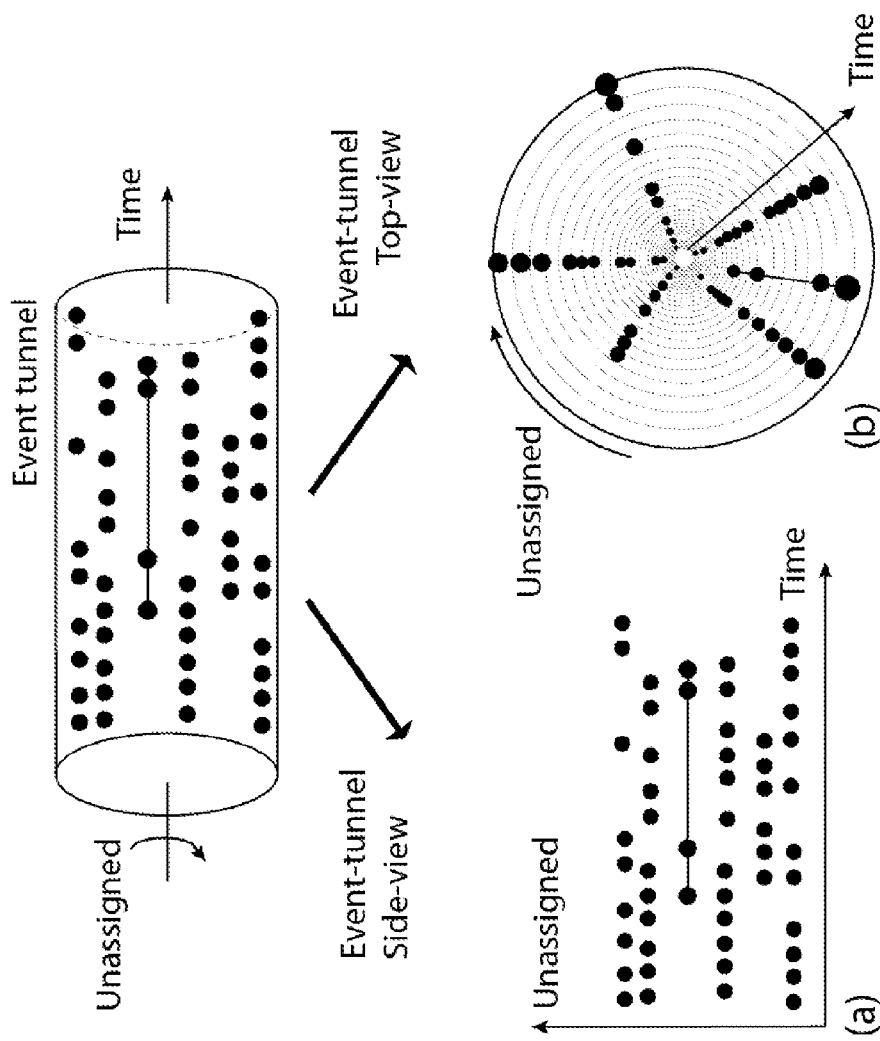
FIG. 3 shows the underlying concept of the visualization method of the invention as a top view derived from an event stream in an event tunnel.

FIG. 3 shows the use of the event tunnel concept of FIG. 2 for visualizing an event stream in (a) a side view of the event tunnel and (b) a top view onto the event tunnel. The top view (b) looks into the stream of events along the time-axis, and the side view (a) plots the events in temporal order. Each event is plotted as a "glyph" which has in this example the form of a small sphere.

In the event-tunnel top-view (b) the 3D view into the event tunnel is mapped to a radial 2D rendering: Events on the inner circles of the tunnel are displayed smaller to simulate perspective projection. This intuitively visualizes that the entropy and business value of the most recent events are usually higher in comparison to similar but older events. This tendency results from the fact that the most recent events are more relevant for a business analyst as well as the final events of a business process generally characterize best the outcome of a business case. The perspective projection in the event-tunnel top-view reflects this requirement.

Following the metaphor of the event tunnel, the distance from the center ("origin") of the top view is defined by the dimension mapped to the cylinder axis, i.e. time. In the top view (b), the time dimension becomes the radial distance from the origin of the representation on a suitable display, e.g. a computer screen or a printer's printout. Thus, the radial distance of each glyph plotted for an event on the display is proportional to its occurrence time in the stream; furthermore, to obtain an intuitive visual perspective view into the event tunnel also the size of each glyph plotted for an event on the display is proportional to its occurrence time.

To avoid unreadable small glyphs in the center of the display around the origin, minimum values for the radial distance and the size of the glyphs can be set, leading to a circular free space around the origin, which can also be interpreted as the open far end of the event tunnel.

The second positioning parameter of each glyph, its angular position, is controlled by a specific positioning algorithm called "centric event sequence placement policy" (CESP) in the following. CESP positioning will now be explained in detail.

The CESP policy is focused on sequences of correlated events, such as the events of a business process instance. The position of an event depends solely upon its membership in a group of correlated events. The CESP algorithm follows event sequences and plots glyphs for events in coherent chains.

Figure 4B:
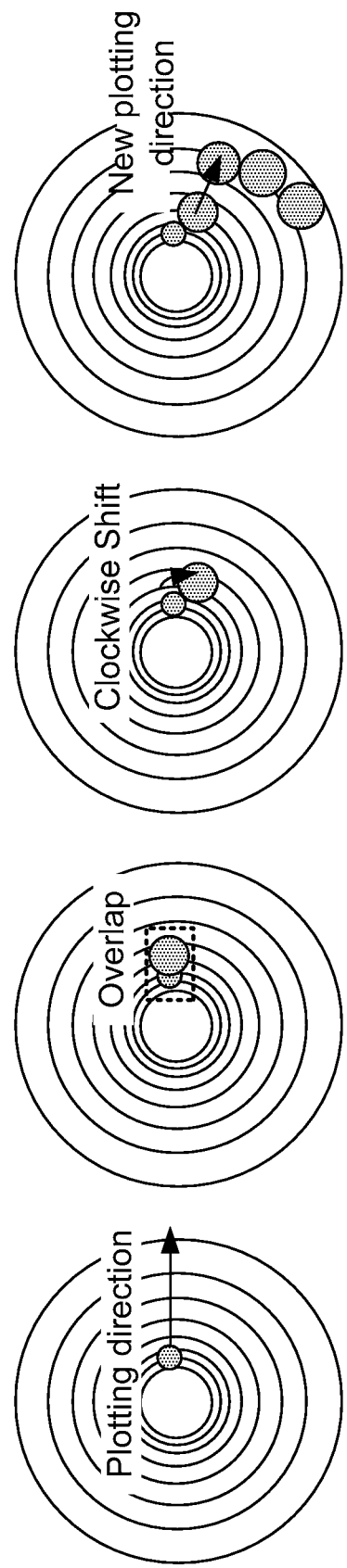
FIG. 4*b* shows the effect of the CESP algorithm on the plotting of glyphs for subsequent events of a set of correlated events in four stages.

An exemplary implementation of the CESP algorithm is shown in FIG. 4a in pseudocode, while FIG. 4b shows the effect of CESP in plotting glyphs of subsequent events of a single set of correlated events in four stages. As can be seen, the CESP algorithm avoids overlapping of event glyphs on the display by angular shifts: The angular position of the glyph of a succeeding event in a set is chosen equal to that of the preceding event in the set unless these two glyphs would overlap in which case the angular position of the glyph of said subsequent event is shifted in a given direction (here: clockwise) by an amount just sufficient to avoid such overlap, as defined in line (1) of the pseu-docode sample of FIG. 4a and depicted in stage (iii) of FIG. 4b.

The CESP algorithm results in specific patterns, being abstract representations of underlying business process instances. As regular instances of a business process proceed more or less according to a template, characteristic patterns emerge. This enables the analyst to derive fuzzy, visual template representations for certain business processes. Anomalies can then be assessed by comparing the resulting pattern with the expected template.

Figure 4C:
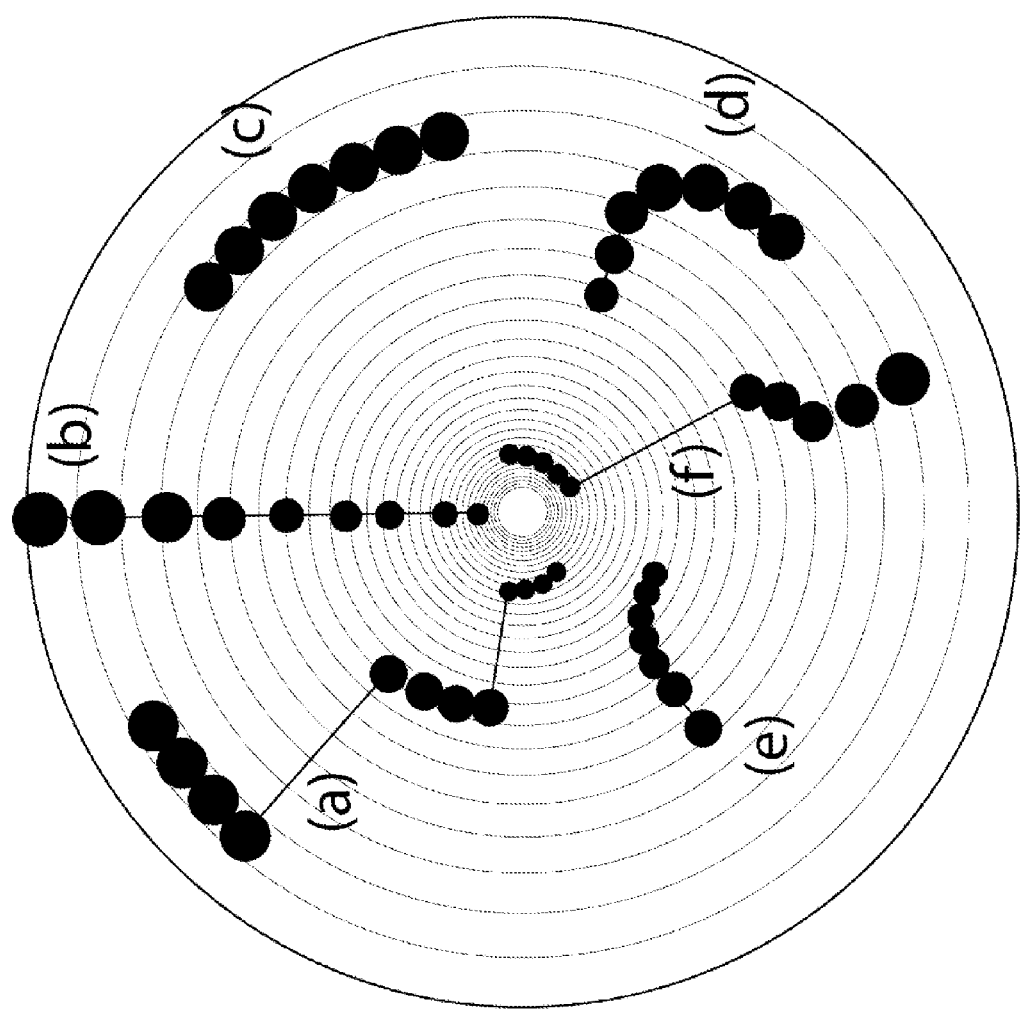
FIG. 4*c* shows six exemplary glyphs patterns generated by the CESP algorithm for six exemplary event correlation sets.

Although the emerging patterns can be application and data specific, several basic, high-level patterns can be characterized. FIG. 4c shows six exemplary patterns of glyphs generated by the CESP algorithm for six exemplary sets of correlated events, and the following Table 1 lists how these patterns can be interpreted:

TABLE 1

| Glyph Pattern | Interpretation |
| --- | --- |
| (a) Stair pattern | Represents a business process whose execution is characterized by several idle times (potentially exceptional delays). |
| (b) Non-interfering chain | A long-running process, whose stages are passed straight forward in regular time steps. |
| (c) Parallel chain | A fast-executing process (probably automated or machine controlled) without idle times. |
| (d) Acceleration worm | Represents a process whose execution accelerated continuously. |
| (e) Deceleration worm | Represents a process whose execution decelerated continuously. |
| (f) Rattlesnake | Reflects one extreme delay in the execution of a process. |

As can be seen from FIG. 4c, when plotting glyph patterns for more than one set of correlated events a pattern overlap should be avoided as much as possible in order to enhance interpretability. To this end, the CESP algorithm involves the step of setting the angular position of the glyph of the first event in a set accordingly, i.e. the angular position of the glyph of the first event of each set is chosen so that the overlapping of all glyphs of all sets is minimized. This is further explained under reference to FIGS. 4d and 4e.

Figure 4D:
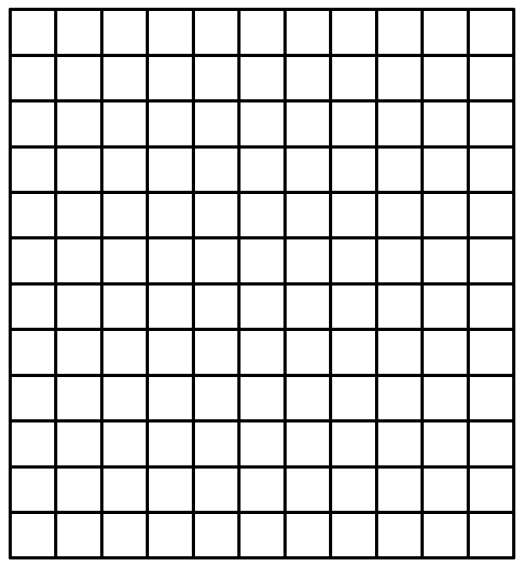
FIGS. 4*d* and 4*e* show the CESP placement step for the first event glyphs in the sets in order to avoid overlapping of all glyph patterns.
Figure 4D:
Figure 4D:
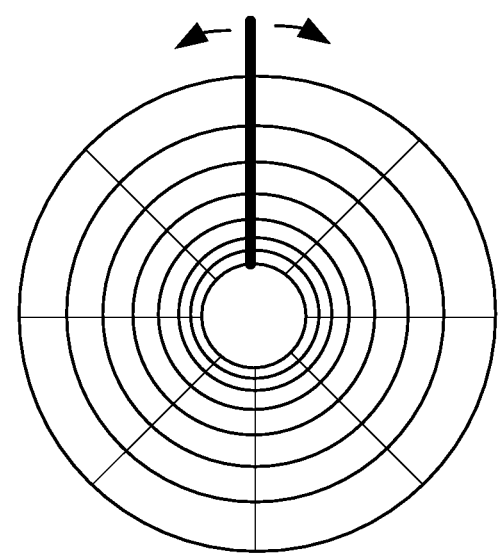
Figure 4E:
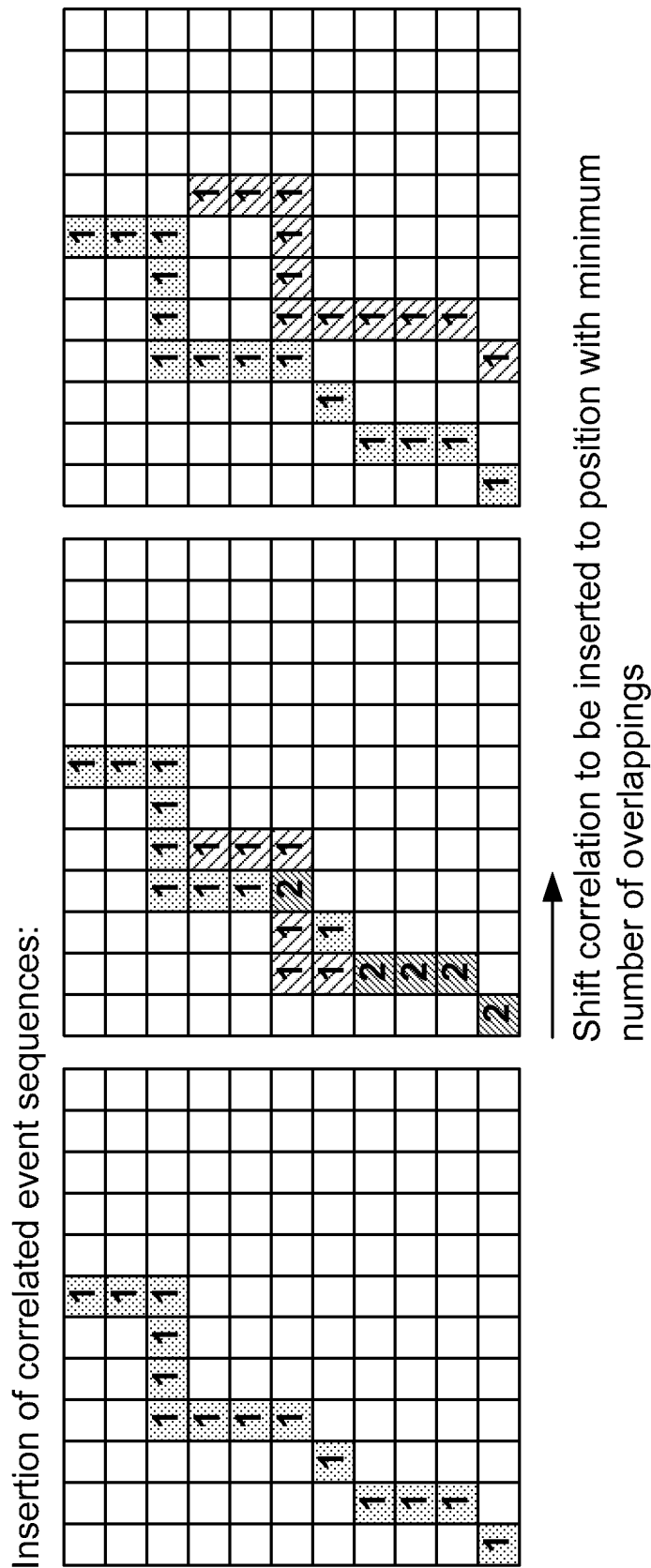

As shown in FIG. 4d, for explanation purposes the radial representation of the event tunnel top view can be wound off to a flat onto which the event glyph patterns can be laid out. FIG. 4e shows in stage (i) the placement of a first glyph pattern for a first correlation set of events. When plotting a second glyph pattern for a second correlation set, overlapping of glyphs could occur, see stage (ii), wherein the numbers indicate the counts of glyphs overlapping at a certain position. Therefore, the first glyph of the second glyph pattern is shifted (to the right in FIG. 4e) just by such an amount that no glyph overlaps another glyph completely.

In practice, if there are few glyph patterns to plot such as in FIG. 4c, even a larger shift can be made so that glyph patterns distribute fairly evenly around the origin, as depicted in FIG. 4c. On the other hand, if there are many glyph patterns to plot, a complete overlap-free plotting may not be possible; in this case a distribution of the glyph patterns is chosen which minimizes the number of overlapping glyphs.

Figure 5:
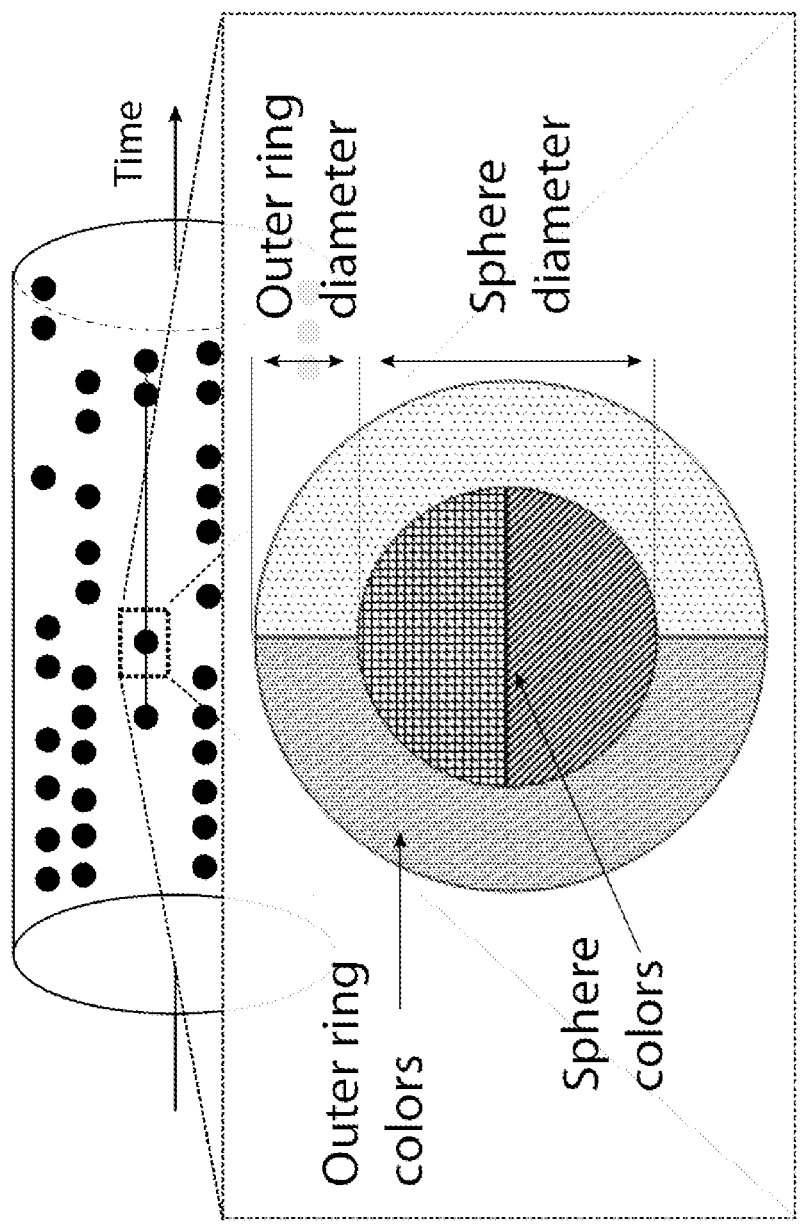
FIG. 5 shows the use of visual features of a glyph in order to encode attributes of its event.

FIG. 5 shows that visual features of a glyph can be used to encode one or more attributes of the event represented by this glyph. Such visual features can be the size and/or shape and/or color of the glyph. In addition, glyphs can be composed of multiple structures each of which encode different attributes. For example, if glyphs of spherical form are used, they can optionally be surrounded by an outer ring (or a semi-transparent 3D-envelope, respectively) which can encode further attributes of the event.

Coding the size parameter of an event glyph is suitable for the mapping of continuous attributes. Per event type, separate mappings can be defined for the sphere diameter and the diameter of the outer ring. The color parameters of a glyph can be utilized to visualize arbitrary event attributes, preferably discrete values of event attributes.

In addition, the sphere surface (and the surface of the outer ring, if any) may be subdivided into visually different sectors to simultaneously encode further different attributes of the event glyph.

If very large numbers of events shall be visualized on one display, a cluster technique can be used wherein several events are grouped into a cluster event having a common occurrence time accorded thereto, and a glyph is plotted for each cluster event using said common occurrence time.

A cluster event can e.g. be interactively collapsed or expanded on a computer screen display. In the collapsed state, its representation is similar to an event glyph; in the expanded state the events can be visualized in a separate zoom view or in the same display as glyphs.

The event visualization obtained with the method of the invention on a display can be generated both "offline" from a stored record of an event stream in a data repository as well as "online" from an event stream captured e.g. in real-time in an event driven system.

The event tunnel top view obtained with the method of the invention, examples of which are depicted in FIG. 3(b) or FIG. 4c, can be output on a static display, e.g. a printout, or handled interactively on a dynamic display such as a computer screen in the way of an interactive zooming, rotating, changing angle of perspective et cet. as known from the field of interactive 3D representation techniques.

Exemplary applications of the method of the invention include the visualization of events e.g. in online betting systems for fraud detection or discovering of anomalies in betting behavior, in real-time logistics systems for supply chain tracing and resource planning, et cet.

The invention is thus not restricted to the specific embodiments and examples disclosed herein but encompasses all variants and modifications thereof falling in the scope and spirit of the appended claims.

What is claimed is:

1. A method of presenting a set of correlated events on a display, each event having a time of occurrence and at least one attribute indicating its correlation with other events of the set, the method comprising:
   plotting a first glyph corresponding to a first event of the set on the display at a first radial distance and a first angular position with respect to an origin, the first radial distance and a size of the first glyph being related to the occurrence time of the first event; and
   plotting a second glyph corresponding to a second event of the set at a second radial distance and a second angular position with respect to the origin, the second radial distance and a size of the second glyph being related to the occurrence time of the second event, the second angular position being equal to the first angular position of the first glyph, unless the first glyph and the second glyph would overlap on the display, in which case the second angular position of the second glyph is shifted by an amount sufficient to avoid such overlap.

2. The method of claim 1, wherein minimum values for radial distances and the size of plotted glyphs are set.

3. The method of claim 1, wherein glyphs in a set are connected by interconnection lines.

4. The method of claim 1, wherein at least one visual feature of each glyph encodes an attribute of its corresponding event.

5. The method of claim 4, wherein said visual feature is the color of the glyph.

6. The method of claim 4, wherein said visual feature is the shape of the glyph.

7. The method of claim 4, wherein said visual feature is the size of the glyph, which is thus related to both the occurrence time of the event corresponding to the glyph and said attribute.

8. The method of claim 4, wherein the surface of at least one glyph is subdivided into visually different sectors, each sector encoding different attributes of its corresponding event.

9. The method of claim 4, wherein at least one glyph has the shape of a sphere which is surrounded by an outer ring, the outer ring encoding at least one further attribute of its corresponding event.

10. The method of claim 9, wherein the outer ring is subdivided into visually different sectors, each sector encoding further different attributes of said corresponding event.

11. The method of claim 1, wherein only glyphs corresponding to events which fall within a preselectable window of time are plotted.

12. The method of claim 1, wherein several events are grouped into a cluster event having a common occurrence time accorded thereto, and a glyph is plotted for each cluster event using said common occurrence time.

13. The method of claim 1, wherein the display includes at least one of a static display and a dynamic display.

14. The method of claim 13, wherein the dynamic display is operatively connected to a computer.

15. The method of claim 1, further comprising storing data related to the time of occurrence and one or more attributes of the events in a data repository.

16. The method of claim 1, further comprising contemporaneously updating the display in approximately real-time.

17. The method of claim 1, further comprising selecting the first angular position of the first glyph so that overlapping of all plotted glyphs is minimized.

18. The method of claim 1, wherein a plurality of sets of correlated events are presented, the method further comprising:
   plotting a third glyph corresponding to a first event in a second set of correlated events on the display at a third radial distance and a third angular position with respect to the origin, the third radial distance and a size of the third glyph being related to the occurrence time of the first event in the second set; and
   plotting a fourth glyph corresponding to a second event in the second set of correlated events at a fourth radial distance and a fourth angular position with respect to the origin, the radial distance and a size of the fourth glyph being related to the occurrence time of the second event in the second set, the fourth angular position being equal to the third angular position of the third glyph, unless the third glyph and the fourth glyph would overlap on the display, in which case the fourth angular position of the fourth glyph is shifted by an amount sufficient to avoid such overlap.

19. The method of claim 18, further comprising choosing the first angular position of the first glyph and the third angular position of the third glyph so that overlapping of all plotted glyphs is minimized.

\* \* \* \* \*